United States Patent [19]

Hall

[11] Patent Number: 5,112,929
[45] Date of Patent: May 12, 1992

[54] OXOLANYL CYCLIC ACETALS AS ANIONIC POLYMERIZATION MODIFIERS

[75] Inventor: James E. Hall, Mogadore, Ohio

[73] Assignee: Bridgestone Corporation, Tokyo, Japan

[21] Appl. No.: 680,878

[22] Filed: Apr. 5, 1991

[51] Int. Cl.$^5$ ............................................. C08F 4/48
[52] U.S. Cl. ........................ 526/181; 526/173; 526/179; 526/180; 526/340; 526/340.2; 502/156; 502/157
[58] Field of Search ............ 526/173, 181, 340, 340.2, 526/179, 180; 502/156, 157

[56] References Cited

U.S. PATENT DOCUMENTS

| | | | |
|---|---|---|---|
| 3,207,742 | 10/1965 | Van de Castle | 260/94.6 |
| 3,451,988 | 6/1969 | Langer, Jr. | 260/94.6 |
| 4,429,091 | 1/1984 | Hall | 526/181 |
| 4,537,939 | 8/1985 | Hall et al. | 526/179 |
| 4,591,624 | 5/1986 | Hall | 526/177 |

Primary Examiner—Fred Teskin
Attorney, Agent, or Firm—Frank J. Troy, Sr.

[57] ABSTRACT

A method for preparing a diene polymer or copolymer having increased amounts of 1,2-microstructure is provided. The method involves polymerizing a diene monomer or mixture of a diene monomer and a vinyl aromatic hydrocarbon monomer in a hydrocarbon solvent in the presence of a catalytically effective amount of a catalyst composition comprising: (a) an organolithium initiator and (b) an oxolanyl cyclic acetal having the structural formula:

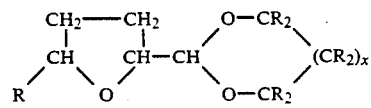

wherein R is selected from the group consisting of hydrogen and alkyl groups containing from 1 to 4 carbon atoms and X is 0 or 1.

19 Claims, No Drawings

OXOLANYL CYCLIC ACETALS AS ANIONIC POLYMERIZATION MODIFIERS

BACKGROUND OF THE INVENTION

The invention relates to a method for preparing diene polymers or copolymer having increased amounts of 1,2-microstructure in the diene units thereof. More particularly, the invention relates to the polymerization of diene monomers or copolymerization of diene monomers and vinyl aromatic hydrocarbon monomers in the presence of a catalyst composition which comprises an organolithium initiator and an oxolanyl cyclic acetal modifier to produce such polymers and copolymers.

Methods of preparing diene polymers or copolymers having increased amounts of 1,2-microstructure in the diene units using an organolithium initiator and various modifier compounds are known in the art as illustrated by the following patents.

U.S. Pat. No. 3,207,742 describes a process for preparing rubbery polymers of 1,3-dienes having an increased ratio of 1,2-microstructure. Such polymers are obtained by conducting the polymerization of the 1,3-diene in the presence of a lithium hydrocarbon initiator and a hexamethylphosphoramide modifier. The amount of the phosphoramide present is from about 10 to 0.1 mole percent based on the amount of diene present.

U.S. Pat. No. 3,451,988 describes a polymerization catalyst for polymerizing vinyl compounds that utilizes mixtures of hydrocarbyl lithium and magnesium compounds, and a modifier which is a bi-functional Lewis base such as tertiary diamines including tetramethylethylene diamine.

U.S. Pat. No. 4,429,091 describes modifiers for the polymerization of dienes utilizing lithium-based initiators. The polymers and copolymers prepared in accordance with the procedure described in this patent contain from between 20 and 95% of the 1,2-microstructure. The catalyst system employed in the production of the polymers or copolymers is a combination of an anionic initiator based on lithium, and a modifier compound selected from the group consisting of linear and cyclic oligomeric oxolanyl alkanes.

U.S. Pat. No. 4,537,939 describes a catalyst system and process for the preparation of diene polymers and copolymers having a 1,2-microstructure content of between about 20 and about 65 percent. The catalyst system which is employed in the production of the polymers or copolymers is a combination of an anionic initiator based on lithium and a phosphine oxide modifier which is substituted with three heterocyclic rings, each hetero ring containing one nitrogen atom and either four, five or six carbon atoms.

U.S Pat. No. 4,591,624 describes a catalyst system and process for the preparation of diene polymers or copolymers having increased amounts of 1,2-microstructure. The catalyst system which is employed in the production of the polymers or copolymers is a combination of an anionic initiator based on lithium and a modifier composition comprising at least one cyclic acetal of a glyoxal.

SUMMARY OF THE INVENTION

In accordance with the present invention, a novel catalyst system and method for preparing diene polymers or copolymers having increased amounts of 1,2-microstructure has been found. The method comprises polymerizing a diene monomer or mixture of a diene monomer and a vinyl aromatic hydrocarbon monomer in a hydrocarbon solvent in the presence of a catalytically effective amount of a catalyst composition comprising:
(a) an organolithium initiator; and
(b) an oxolanyl cyclic acetal having the structural formula:

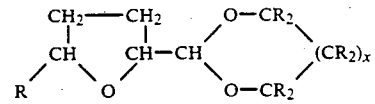

wherein R is selected from the group consisting of hydrogen and alkyl groups containing from 1 to 4 carbon atoms and X is 0 or 1.

Diene polymers or copolymers produced by using the catalyst composition and method of the invention may have 1,2-microstructure or vinyl contents of from 20 to 95 percent.

DETAILED DESCRIPTION OF THE INVENTION

Diene monomers which may be employed in preparing the diene polymers and copolymers are conjugated 1,3-diene monomers. These may contain from 4 to 12 carbon atoms, preferably from 4 to 8 carbon atoms per molecule.

Examples of these dienes include the following: 1,3-butadiene, isoprene; 2,3-dimethyl-1,3-butadiene; 1,3-pentadiene (piperylene); 2-methyl-3-ethyl-1,3-butadiene; 3-methyl-1,3-pentadiene; 2-methyl-3-ethyl-1,3-pentadiene; 2-ethyl-1,3-pentadiene; 1,3-hexadiene; 2-methyl-1,3-hexadiene; 1,3-heptadiene; 3-methyl-1,3-heptadiene; 1,3-octadiene; 3-butyl-1,3-octadiene; 3,4-dimethyl-1,3-hexadiene; 3-n-propyl-1,3-pentadiene; 4,5-diethyl-1,3-octadiene; phenyl-1,3-butadiene; 2,3-diethyl-1,3-butadiene; 2,3-di-n-propyl-1,3-butadiene; 2-methyl-3-isopropyl-1,3-butadiene; and the like. Among the dialkyl butadienes, it is preferred that the alkyl groups contain from 1 to 3 carbon atoms. Dienes containing alkoxy substituents along the chain can also be employed, such as 2-methoxy-1,3-butadiene, 2-ethoxy-3-ethyl-1,3-butadiene, and 2-ethoxy-3-methyl-1,3-hexadiene. The preferred 1,3-diene monomer for use in the method of the invention is butadiene.

The conjugated dienes can be polymerized alone or in admixture with each other. Copolymers can also be prepared from two or more conjugated dienes by charging one compound initially, allowing it to polymerize, and then adding a second conjugated diene, and allowing it to polymerize.

In addition to homopolymers and copolymers of conjugated dienes, copolymers of conjugated dienes with vinyl aromatic hydrocarbons can be made by the process of this invention. Suitable vinyl aromatic hydrocarbon compounds include styrene, 1-vinyl-naphthalene, 2-vinylnaphthalene, and alkyl, cycloalkyl, aryl, alkaryl, aralkyl, alkoxy, aryloxy, and dialkyl-amino derivatives thereof in which the total number of carbon atoms in the combined substituents is generally not greater than 12. Examples of these aromatic monomers include p-methylstyrene; alpha-methylstyrene; 3,5-diethylstyrene; 4-n-propylstyrene; 2,4,6-trimethylstyrene; 4-dodecylstyrene; 3-methyl-5-n-hexylstyrene; 4-cyclohexylstyrene; 4-phenylstyrene; 2-ethyl-4-benzylstyrene; 4-p-tolylstyrene; 3,5-tetramethylstyrene; 4-(4- phenyl-n-butyl) styrene; 3-(4-n-hexylphenyl)-styrene; 4-methoxystyrene; 3,5-diphenoxystyrene; 2,6-dimethyl-4-hexoxystyrene; 4-dimethylaminostyrene; 3,5-diethylaminostyrene; 4-methoxy-6-di-n-propylamino-styrene; 4,5-dimethyl-1-vinylnaphthalene; 3-ethyl-1-vinyl-naphthalene; 6-isopropyl-1-vinyl-napthalene; 2,4-diisopropyl-1-vinylnaphthalene; 3,6-di-p-tolyl-1-vinylnapthalene; 6-cyclohexyl-1-vinylnaphthalene; 4,5-diethyl-8-octyl-1-vinylnaphthalene; 3,4,5,6-tetramethyl-1-vinyl-naphthalene; 3,6-di-n-hexyl-1-vinylnaphthalene; 8-phenyl-1-vinylnaphthalene; 5-(2,4,6-trimethylphenyl)-1-vinylnaphthalene; 3,6-di-ethyl-2-vinylnaphthalene; 7-dodecyl-2-vinylnaphthalene; 4-n-propyl-5-n-butyl-2-vinylnaphthalene; 6-benzyl-2-vinylnaphthalene; 3-methyl-5,6-diethyl-8-n-propyl-2-vinylnaphthalene; 4-p-tolyl-2-vinylnaphthalene; 5-(3-phenyl-n-propyl)-2-vinylnaphthalene; 4-methoxy-1-vinylnaphthalene; 6-phenoxyl-1-vinylnaphthalene; 3,6-dimethylamino-1-vinylnaphthalene; 7-dihexony-2-vinylnaphthalene; and the like. The preferred vinyl aromatic hydrocarbon monomer for use in the method of the invention is styrene.

The amount of conjugated diene monomer and vinyl aromatic hydrocarbon monomer included in the copolymers may vary considerably depending on the desired copolymer properties. Thus, the copolymers may contain from about 5 to about 95 percent by weight of conjugated diene units and from about 5 to about 95 percent by weight of vinyl aromatic hydrocarbon units. The preferred copolymers are those containing from 40 to 85 percent by weight of conjugated diene units and from 15 to 60 percent by weight of vinyl aromatic hydrocarbon units.

As indicated, component (a) of the catalyst composition of the invention is an organolithium initiator. The organolithium initiator employed may be any of the anionic organolithium initiators known in the art to be useful in the polymerization of 1,3-diene monomers or copolymerization of 1,3-diene monomers and vinyl aromatic hydrocarbon monomers. In general, the organolithium compounds are hydrocarbyl lithium compounds of the formula R(Li)x wherein R represents hydrocarbyl groups containing from one to about 20 carbon atoms, and preferably from about 2 to 8 carbon atoms, and x is an integer from 1 to 4. Although the hydrocarbyl group preferably is an aliphatic group, the hydrocarbyl groups may also be cycloaliphatic or aromatic. The aliphatic groups may be primary, secondary or tertiary although the primary and secondary groups are preferred. Examples of aliphatic hydrocarbyl groups include methyl, ethyl, n-propyl, isopropyl, n-butyl, sec-butyl, t-butyl, n-amyl, sec-amyl, n-hexyl, sec-hexyl, n-heptyl, n-octyl, n-nonyl, n-dodecyl and octadecyl. The aliphatic groups may contain some unsaturation such as allyl, 2-butenyl, etc. Cycloalkyl groups are exemplified by cyclohexyl, methylcyclohexyl, ethylcyclohexyl, cycloheptyl, cyclopentylmethyl, methylcyclopentylethyl. Examples of aromatic hydrocarbyl groups include phenyl, tolyl, phenylethyl, benzyl, naphthyl, phenylcyclohexyl, etc.

Specific examples of organolithium compounds which are useful as anionic initiators in the polymerization of conjugated dienes or copolymerization of conjugated dienes and vinyl aromatic hydrocarbons in accordance with the process of this invention include the following: n-butyl lithium, n-propyl lithium, isobutyl lithium, tertiary butyl lithium, amyl lithium, cyclohexyl lithium.

Mixtures of different lithium initiator compounds also can be employed preferably containing one or more lithium compounds such as R(Li)x. The preferred organolithium initiator is n-butyl lithium.

Other lithium catalysts which can be employed alone or in combination with the hydrocarbyl lithium initiators are lithium dialkyl amines, lithium dialkyl phosphines, lithium alkyl aryl phosphines and lithium diaryl phosphines.

The amount of initiator required to effect the desired polymerization can be varied over a wide range depending upon a number of factors such as the desired polymer molecular weight, the desired 1,2- and 1,4-content, and the desired physical properties for the polymer produced. In general, the amount of initiator utilized may vary from as little as 0.20 millimole of lithium per 100 grams of monomer(s) up to about 100 millimoles of lithium per 100 grams of monomers(s) depending upon the desired polymer molecular weight.

As indicated above, component (b) of the catalyst composition of the invention is an oxolanyl cyclic acetal having the structural formula:

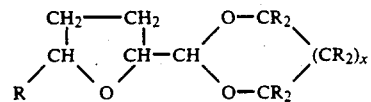

wherein R is selected from the group consisting of hydrogen and alkyl groups containing from 1 to 4 carbon atoms and x is 0 or 1.

The oxolanyl cyclic acetal modifiers may generally be prepared by reacting furaldehyde or an alkyl-substituted furaldehyde with a dihydric alcohol such as a diol in the presence of an acid. Once the cyclic structures are formed, these reaction products are hydrogenated in the presence of suitable hydrogenation catalysts such as nickel based catalysts. Any suitable hydrogenation process known in the art may be employed to produce the modifier compounds of the above structural formula. A typical procedure for producing oxolanyl cyclic acetals is set forth in the examples below.

Suitable oxolanyl cyclic acetal modifiers for use in the catalyst system include oxolanyl dioxanes such as 2-(2-oxolanyl)dioxane; 2-(2-oxolanyl)-4,4,6-trimethyl-dioxane; 2-(5-methyl-2-oxolanyl)-4,4,6-trimethyl-dioxane; 2-(2-oxolanyl)-5,5-dimethyldioxane and the like and oxolanyl dioxolanes such as 2-(2-oxolanyl)-dioxolane; 2-(2-oxolanyl)-4-t-butyl-dioxolane; 2-(2-oxolanyl)-4,5-dimethyl-dioxolane; 2-(2-oxolanyl)-4,4,5,5-tetramethyl-dioxolane and the like.

The amounts of oxolanyl cyclic acetal modifiers employed in the polymerization reactions of the invention are based on the molar ratio of modifier (b) to initiator (a). The molar ratio of oxolanyl cyclic acetal modifier to organolithium initiator may broadly range from 1.0:20.0 to 20.0:1.0 with the preferred range being from 1.0:5.0 to 10.0:1.0.

The catalyst mixture of the invention is employed in amounts sufficient to produce polymers of the desired molecular weights. Thus, the amounts of catalyst mixture are selected so as to produce polymers having molecular weights (Mn) ranging from 1,000 to 1,000,000, preferably from 100,000 to 500,000.

The millimole ratio of the catalyst mixture to the weight of the monomers which is employed in the preparation of the polymers of the present invention is based upon the number of millimoles of the anionic initiator based on lithium per hundred grams of monomer.

The amount of catalyst mixture, as well as the ratio of the oxolanyl cyclic acetal modifier to the anionic initiator, employed in producing the polymers of the present invention determine the content of 1,2-microstructure in the diene units of the polymer finally produced. It has been determined that the diene polymers produced according to the process of this invention may have 1,2-microstructure contents ranging between about 20 to about 95 percent.

All amounts of anionic initiators and oxolanyl cyclic acetal modifiers as indicated by moles per grams of monomer or by ratio of components in the instant invention are considered to be catalytically effective amounts, that is, effective amounts for initiating and conducting polymerization of the disclosed monomer systems to produce a polymer or copolymer containing a 1,2-microstructure ranging between about 20 to about 95 percent in the diene units.

Process conditions such as the initial and maximum temperature of the polymerization reaction and the absolute concentration of modifier can independently affect the final 1,2-microstructure content of the 1,3-diene polymers. These conditions can be controlled for each monomer reaction system to produce the final desired 1,2-microstructure content of from about 20 to about 95 percent. It is desirable to produce polymers and copolymers having a 1,2-microstructure between 30 and 80 percent in the diene units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of the monomers in the process of the catalyst composition of the inventor is generally conducted in a solution of the monomers in an inert hydrocarbon solvent or diluent in which the monomers, initiator and modifier are soluble. The preferred hydrocarbon solvents are alkanes such as ethane, propane, pentane, hexane, heptane, octane, cyclopentane, cyclohexane, cycloheptane and the like. Aromatic solvents such as toluene act as telomerizing agents and can be used when lower molecular weight polymers are desired. A particularly preferred hydrocarbon solvent is n-hexane. The solvents can be employed alone or in combination, e.g. as a hydrocarbon distillate fraction.

The amounts of hydrocarbon solvent employed in the solution polymerization of the monomers may range from 10 to 95 percent with preferred amounts being from 65 to 85 percent.

The polymerization of the monomers in the aforementioned system is preferably effected adiabatically with an increase in temperature occurring during the course of the reaction. As used in this connection the term adiabatic polymerization means that heat is neither supplied nor removed during the course of polymerization.

The present polymerization system is applicable to solution polymerization techniques which are conducted at temperatures of 0° to 160° C., preferably 40° to 140° C. Any temperature in this range of 0° C. to 160° C. which gives a convenient polymerization rate while producing a polymer having a desired 1,2-microstructure content is acceptable. If the operation is to be conducted as a batch operation, initiation temperatures of less than 90° C. are preferred. If the operation is to be a continuous operation higher initiation temperatures can be employed, such as 100° C. to 120° C., and it is preferred that the polymerization process be maintained in a range of from 90° C. to 160° C., most preferably 115° C. to 140° C.

The polymerization reaction can be performed at pressures between 0.5 to 100 atmospheres. When the desired degree of polymerization has been reached, the polymer can be isolated by precipitation with a non-solvent such as methanol, isopropanol or water and an appropriate antioxidant can be added at this stage of polymerization. The recovered polymer or copolymer can be dried using any convenient drying process such as drum drying. The polymers and copolymers depending on their molecular weight and composition may be used for a variety of applications ranging from molding materials nd adhesives to rubber products such as tires.

The following examples are submitted for the purpose of further illustrating the nature of the present invention and are not intended as a limitation on the scope thereof. Parts and percentages shown in the examples are by weight unless otherwise indicated.

EXAMPLE A

This example illustrates a typical procedure for preparing the oxolanyl cyclic acetal modifiers of the catalyst composition of the invention. In this example, 2-(2-oxolanyl)-4,4,6-trimethyl dioxane was prepared by reacting 2-furaldehyde and 2-methyl 2,4-pentane diol and then hydrogenating the reaction product in accordance with the following procedure:

A 1 liter 3-necked flask was fitted with a Dean-Stark trap. 100.5 g 2-furaldehyde (1.045 mole) was added to 123.6 g 2-methyl 2,4-pentane diol (1.046 mole) plus 0.5 g p-toluenesulfonic acid in 500 ml. hexane. The contents were heated to reflux and water of reaction was azeotroped from the reaction mixture over two hours. Temperature maintained below 90° C. Hexane was removed under vacuum at 25° C. KOH pellets added to neutralize and product distilled at 77° C. and 1.2 mm Hg. Yield=191 g. I.R. indicated the production of 2-(2-furfuryl)-4,4,6-trimethyl dioxane.

The material was hydrogenated using Nickel Octoate and triisobutyl aluminum. Hydrogenated product was distilled at 67° C. and 1.2 mm Hg. I.R. indicated the production of 2-(2-oxolanyl)-4,4,6-trimethyl dioxane. Yield=171.8 g or 82.1% yield.

Note: 2-(2-oxolanyl)-dioxolane was prepared in similar manner by reacting 2-furaldehyde and ethylene glycol and then hydrogenating the reaction product. The product characterization was confirmed by I. R., 1 H nmr and 13 C nmr.

The following examples illustrate the preparation of polybutadiene and butadiene/styrene copolymers using the catalyst compositions and polymerization methods of the invention. In the examples, the polymerizations were run in 28 ounce crown-capped bottles using hexane as the polymerization solvent. The 1,3-butadiene monomer was used as a 25 percent solution in hexane. The styrene monomer was added as a 33 percent solution in hexane. The n-butyllithium initiator (hereafter N-BuLi) and various oxolanyl cyclic acetal (hereinafter OCA) modifiers were added. The molar ratio of OCA modifier to n-BuLi initiator was varied as shown in the following tables.

The bottles were then placed in rotating water bottles and polymerized for 18 hours at various temperatures. The resultant polymers were analyzed for 1,2-microstructure content and in the case of copolymers for styrene content using Infrared Spectroscopy (IR).

EXAMPLES 1-4

In these examples, polybutadienes containing varying amounts of 1,2-microstructure were prepared by polymerizing 1,3-butadiene using n-butyllithium as the initiator and 2-(2-oxolanyl)-dioxolane as the modifier. The modifier to initiator molar ratio was varied and the polymerizations were conducted for 18 hours at the temperature indicated. Test conditions and results are shown in Table I.

TABLE I

| Example | Temp. °C. | Modifier/ Initiator Molar Ratio | Conversion % | % 1,2* |
|---|---|---|---|---|
| 1 | 50 | 0.39/1.0 | 97 | 56 |
| 2 | 50 | 0.78/1.0 | 97 | 62 |
| 3 | 50 | 1.56/1.0 | 97 | 70 |
| 4 | 50 | 2.72/1.0 | 97 | 74 |

*% 1,2-microstructure

EXAMPLES 5-10

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(2-oxolanyl)-4,4,5,5-tetramethyl-dioxolane as the modifier. The modifier to initiator molar ratio was varied and the polymerizations were conducted for 18 hours at varying temperatures. Test conditions and results are shown in Table II.

TABLE II

| Example | Temp. °C. | Modifier/ Initiator Molar Ratio | % 1,2 | Styrene % |
|---|---|---|---|---|
| 5 | 30 | 0.48/1.0 | 82 | — |
| 6 | 30 | 1.43/1.0 | 90 | — |
| 7 | 50 | 1.91/1.0 | 76 | — |
| 8 | 70 | 1.43/1.0 | 64 | — |
| 9 | 30 | 2.0/1.0 | 77* | 24 |
| 10 | 70 | 2.0/1.0 | 64* | 24 |

*Based on butadiene = 100

EXAMPLES 11-14

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(5-methyl-2-oxolanyl)-4,4,6-trimethyldioxane as the modifier. The modifier to initiator ratio was varied and the polymerizations were conducted for 18 hours at varying temperatures. Test conditions and results are shown in Table III.

TABLE III

| Example | Temp. °C. | Modifier/ Initiator Molar Ratio | % 1,2 | Styrene % |
|---|---|---|---|---|
| 11 | 30 | 1.0/1.0 | 88 | — |
| 12 | 70 | 2.0/1.0 | 75 | — |
| 13 | 30 | 2.0/1.0 | 84 | 32 |
| 14 | 70 | 2.0/1.0 | 70 | 32 |

EXAMPLES 15-16

In these examples, polybutadienes containing varying amounts of 1,2-microstructure were prepared by polymerizing 1,3-butadiene using n-butyllithium initiator and 2-(2-oxolanyl)-4-butyldioxolane as the modifier. The modifier to initiator ratio was 1.0/1.0 and the polymerizations were conducted for 18 hours at varying temperatures. Test conditions and results are shown in Table IV.

TABLE IV

| Example | Temp. °C. | Modifier/ Initiator Molar Ratio | % 1,2 |
|---|---|---|---|
| 15 | 30 | 1.0/1.0 | 75 |
| 16 | 70 | 1.0/1.0 | 59 |

EXAMPLES 17-20

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(2-oxolanyl)-dioxane as the modifier. The modifier to initiator ratio was varied and the polymerizations were conducted for 18 hours at varying temperatures. Test conditions and results are shown in Table V.

TABLE V

| Example | Temp. °C. | Modifier/ Initiator Molar Ratio | % 1,2 | Styrene % |
|---|---|---|---|---|
| 17 | 30 | 2.0/1.0 | 74 | — |
| 18 | 70 | 2.0/1.0 | 65 | — |
| 19 | 30 | 1.0/1.0 | 67 | 32 |
| 20 | 70 | 1.0/1.0 | 57 | 31 |

EXAMPLES 21-24

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(2-oxolanyl)-4,4,6-trimethyl-dioxane as the modifier. The modifier to initiator ratio was varied and the polymerizations were conducted for 18 hours at varying temperatures. Test conditions and results are shown in Table VI.

TABLE VI

| Example | Temp. °C. | Modifier/ Initiator Molar Ratio | % 1,2 | Styrene % |
|---|---|---|---|---|
| 21 | 30 | 1.0/1.0 | 85 | — |
| 22 | 70 | 2.0/1.0 | 72 | — |
| 23 | 30 | 2.0/1.0 | 79 | 31 |

TABLE VI-continued

| Example | Temp. °C. | Modifier/ Initiator Molar Ratio | % 1,2 | Styrene % |
|---|---|---|---|---|
| 24 | 70 | 1.0/1.0 | 61 | 31 |

EXAMPLES 25-28

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(2-oxolanyl)-4-methyl-dioxolane as the modifier. The modifier to initiator ratio was varied and the polymerizations were conducted for 18 hours at varying temperatures. Test conditions and results are shown in Table VII.

TABLE VII

| Example | Temp. °C. | Modifier/ Initiator Molar Ratio | % 1,2 | Styrene % |
|---|---|---|---|---|
| 25 | 30 | 1.0/1.0 | 72 | — |
| 26 | 70 | 1.0/1.0 | 44 | — |
| 27 | 30 | 1.0/1.0 | 62 | 41 |
| 28 | 70 | 2.0/1.0 | 54 | 33 |

EXAMPLES 29-32

In these examples, polybutadienes and butadiene/styrene copolymers containing varying amounts of 1,2-microstructure were prepared by polymerizing 1,3-butadiene and copolymerizing 1,3-butadiene and styrene using n-butyllithium initiator and 2-(2-oxolanyl)-4,5-dimethyl-dioxolane as the modifier. The modifier to initiator ratio was 2.0/1.0 and the polymerizations were conducted for 18 hours at varying temperatures. Test conditions and results are shown in Table VIII.

TABLE VIII

| Example | Temp. °C. | Modifier/ Initiator Molar Ratio | % 1,2 | Styrene % |
|---|---|---|---|---|
| 29 | 30 | 2.0/1.0 | 76 | — |
| 30 | 70 | 2.0/1.0 | 57 | — |
| 31 | 30 | 2.0/1.0 | 70 | 36 |
| 32 | 70 | 2.0/1.0 | 53 | 37 |

EXAMPLES 33-36

In these examples, polybutadienes and butadiene/styrene copolymers containing varying amounts of 1,2-microstructures were prepared by polymerizing 1,3-butadiene and copolymerizing 1,3-butadiene and styrene using n-butyllithium initiator and 2-(2-oxolanyl)-5,5-dimethyl-dioxane. The modifier to initiator ratio was 1.0/1.0 and polymerizations were conducted for 18 hours at varying temperatures. Test conditions and results are shown in Table IX.

TABLE IX

| Example | Temp. °C. | Modifier/ Initiator Molar Ratio | % 1,2 | Styrene % |
|---|---|---|---|---|
| 33 | 30 | 1.0/1.0 | 74 | — |
| 34 | 70 | 1.0/1.0 | 59 | — |
| 35 | 30 | 1.0/1.0 | 69 | 34 |
| 36 | 70 | 1.0/1.0 | 54 | 31 |

EXAMPLE 37

In this example, polyisoprene was prepared by polymerizing Isoprene monomer in hexane using nBuLi initiator and 2-(2-oxolanyl)-4,4,5,5-tetramethyl dioxolane. The modifier to initiator molar ratio was 1.0/1.0 and the polymerization was conducted for 18 hours at 30° C. Using a combination of 'Hnmr and I.R. spectroscopy the microstructure of the polyisoprene was determined to be:

10% 1,4 units
15% 1,2 units
75% 3,4 units

I claim:

1. A method for preparing a diene polymer or copolymer having increased amounts of 1,2-microstructure which comprises polymerizing a diene monomer or a mixture of a diene monomer and a vinyl aromatic hydrocarbon monomer in a hydrocarbon solvent in the presence of a catalytically effective amount of a catalyst composition comprising:
   (a) an organolithium initiator; and
   (b) an oxolanyl cyclic acetal having the structural formula:

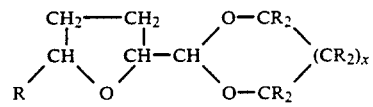

wherein R is selected from the group consisting of hydrogen and alkyl groups containing from 1 to 4 carbon atoms and X is 0 or 1.

2. The method of claim 1 wherein the diene monomer is 1,3-butadiene.
3. The method of claim 1 wherein the diene monomer is isoprene.
4. The method of claim 1 wherein the vinyl aromatic hydrocarbon monomer is styrene.
5. The method of claim 1 wherein said mixture is a mixture of 1,3-butadiene and styrene.
6. The method of claim 1 wherein said mixture contains from about 5 to about 95 percent by weight of diene monomer and from about 5 to about 95 percent by weight of vinyl aromatic hydrocarbon monomer.
7. The method of claim 1 wherein the organolithium initiator is n-butyllithium.
8. The method of claim 1 wherein said oxolanyl cyclic acetal is selected from the group consisting of oxolanyl dioxanes and oxolanyl dioxolanes.
9. The method of claim 1 wherein the molar ratio of oxolanyl cyclic acetal (b) to organolithium initiator (a) is from 1:20 to 20:1.
10. The method of claim 1 wherein the polymerization is conducted at a temperature in the range of from about 0° to about 160° C.
11. A method for increasing the amounts of 1,2-microstructure in a diene polymer or copolymer which comprises polymerizing a diene monomer or mixture of a diene monomer and vinyl aromatic hydrocarbon monomer using a catalyst composition comprising:
   (a) an organolithium initiator; and
   (b) an oxolanyl cyclic acetal having the structural formula:

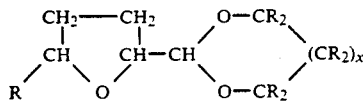

wherein R is selected from the group consisting of hydrogen and alkyl groups containing from 1 to 4 carbon atoms and X is 0 or 1.

12. The method of claim 11 wherein the diene monomer is 1,3-butadiene.

13. The method of claim 11 wherein the diene monomer is isoprene.

14. The method of claim 11 wherein the vinyl aromatic hydrocarbon monomer is styrene.

15. The method of claim 11 wherein said mixture is a mixture of 1,3-butadiene and styrene.

16. The method of claim 11 wherein said mixture contains from about 5 to about 95 percent by weight of diene monomer and from about 5 to about 95 percent by weight of vinyl aromatic hydrocarbon monomer.

17. A catalyst composition comprising:
(a) an organolithium initiator; and
(b) an oxolanyl cyclic acetal having the structural formula:

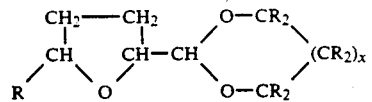

wherein R is selected from the group consisting of hydrogen and alkyl groups containing from 1 to 4 carbon atoms and X is 0 or 1.

18. The catalyst composition of claim 17 wherein the organolithium initiator is n-butyllithium.

19. The catalyst composition of claim 17 wherein the oxolanyl cyclic acetal is selected from the group consisting of oxolanyl dioxanes and oxolanyl dioxolanes.

* * * * *